United States Patent
Apfel (10) Patent No.: US 9,065,657 B2
(45) Date of Patent: Jun. 23, 2015

(54) POWERED DEVICE INCLUDING A DETECTION SIGNATURE CIRCUIT

(75) Inventor: Russell J. Apfel, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1967 days.

(21) Appl. No.: 11/643,727

(22) Filed: Dec. 21, 2006

(65) Prior Publication Data

US 2008/0150718 A1 Jun. 26, 2008

(51) Int. Cl.
G06F 15/173 (2006.01)
H04L 12/10 (2006.01)

(52) U.S. Cl.
CPC ....................................... *H04L 12/10* (2013.01)

(58) Field of Classification Search
USPC ........ 709/220; 310/321; 307/2, 9.1; 324/713;
370/241; 323/282; 235/454
See application file for complete search history.

(56) References Cited

U.S. PATENT DOCUMENTS

| | | | |
|---|---|---|---|
| 5,032,753 A * | 7/1991 | Yamaguchi et al. .......... | 310/317 |
| 5,991,885 A | 11/1999 | Chang et al. | |
| 6,038,470 A * | 3/2000 | Ploetz et al. .................. | 600/547 |
| 6,535,983 B1 | 3/2003 | McCormack et al. | |
| 6,650,622 B1 * | 11/2003 | Austerman et al. ........... | 370/241 |
| 6,662,135 B1 * | 12/2003 | Burns et al. ................... | 702/120 |
| 6,701,443 B1 | 3/2004 | Bell | |
| 6,841,979 B2 * | 1/2005 | Berson et al. ................. | 323/282 |
| 6,874,093 B2 | 3/2005 | Bell | |
| 6,954,708 B2 | 10/2005 | Rakshani et al. | |
| 6,985,713 B2 | 1/2006 | Lehr et al. | |
| 8,508,252 B2 * | 8/2013 | Farjadrad ........................ | 326/30 |
| 2002/0196004 A1 * | 12/2002 | Berson et al. ................. | 323/282 |
| 2006/0005055 A1 * | 1/2006 | Potega .......................... | 713/300 |
| 2006/0019629 A1 * | 1/2006 | Berson et al. ................. | 455/402 |
| 2006/0168458 A1 | 7/2006 | Stineman, Jr. et al. | |
| 2006/0168459 A1 | 7/2006 | Dwelley et al. | |
| 2006/0181316 A1 * | 8/2006 | Miller, Jr. ...................... | 327/115 |
| 2007/0085675 A1 * | 4/2007 | Darshan et al. ........... | 340/538.11 |
| 2007/0108282 A1 * | 5/2007 | Gibson .......................... | 235/454 |
| 2008/0005055 A1 * | 1/2008 | Horvitz .......................... | 706/62 |
| 2008/0150718 A1 * | 6/2008 | Apfel .......................... | 340/568.2 |
| 2008/0181316 A1 * | 7/2008 | Crawley et al. ............... | 375/258 |
| 2011/0202784 A1 * | 8/2011 | Mizutani ....................... | 713/340 |
| 2012/0001661 A1 * | 1/2012 | Farjadrad ...................... | 327/108 |

OTHER PUBLICATIONS

IEEE 802.3af PD—Power over Ethernet Interface Controller with Dual Current Limit, www.linear.com, Linear Technology, LTC4257-1, pp. 1-21.

* cited by examiner

Primary Examiner — Tammy Nguyen
(74) Attorney, Agent, or Firm — Cesari & Reed LLP; R. Michael Reed (57) ABSTRACT

In a particular embodiment, a method of producing a powered device detection signature includes rectifying a device detection input received from a powered network to produce a rectified detection input at a powered device. The method further includes applying the rectified detection input to a signature resistor and to a variable impedance circuit in parallel with the signature resistor to produce a device signature that is substantially constant over a power range associated with the device detection input.

21 Claims, 6 Drawing Sheets

POWERED DEVICE INCLUDING A DETECTION SIGNATURE CIRCUIT

FIELD OF THE DISCLOSURE

The present disclosure is generally related to powered devices in Power over Ethernet (PoE) networks, and more particularly to powered devices including a detection signature circuit.

BACKGROUND

Power over Ethernet (PoE), which is outlined in IEEE Std 802.3™-2005 clause 33 (the PoE standard), refers to a technique for delivering power and data to an electronic device via a network cable, such as a twisted pair Ethernet cable. In a PoE system, power sourcing equipment (PSE) provides a power supply via an Ethernet cable to electronic devices, which may be referred to as powered devices. PoE eliminates the need for a separate power source to deliver power to attached powered devices. Such powered devices may include Voice over Internet Protocol (VoIP) telephones, wireless routers, security devices, field devices to monitor process control parameters, data processors, and other electronic devices.

The PoE standard specifies a detection process for detecting a PoE powered device that is coupled to the PSE before supplying power via the Ethernet cable. To perform the detection process, the PSE provides a voltage level that is within a range of 2.8 to 10 Volts DC on pairs of wires of the Ethernet cable and monitors a received current (Amps) or a received voltage (V) to detect a resistance within an expected range (approximately 25 K-ohms). The PSE determines the powered device's presence using a measured Volt-Amp (VA) slope related to the powered device's voltage/current signature. If the PSE does not detect a valid resistance, the PSE does not apply power to the Ethernet port assigned to the electronic device.

Typically, a powered device includes a diode bridge to rectify power received from the PSE and includes a precision external resistor to provide the 25 k-ohm impedance. However, each of the diodes of the diode bridge also provides an impedance that is related to the current and that is in series with the precision external resistor. In particular, as the current increases, the voltage drop across each diode decreases. For example, the diodes may each have an impedance of approximately 928 ohms at 28 uA and 74.4 ohms at 348 uA. Moreover, the impedance of the diodes may vary with temperature.

In general, the diodes in the diode bridge may alter the effective impedance of the powered device and may affect the device signature. In general, the effective impedance of the powered device refers to a vector sum of the resistance and reactance presented by the device in response to an applied signal. If the resistance of the precision resistor is at approximately 24 k-ohms, the diodes of the diode bridge may cause the effective impedance of the powered device to vary. For example, if the impedance is measured in ohms, the impedance may vary from approximately 25.86 k-ohms to 24.14 k-ohms. Moreover, the impedance of the diode bridge may vary with temperature, which may also alter the effective impedance and affect the device signature. Hence, there is a need for an improved device detection impedance circuit.

SUMMARY

In a particular embodiment, a method of producing a powered device detection signature includes rectifying a device detection input received from a powered network to produce a rectified detection input at a powered device. The method further includes applying the rectified detection input to a signature resistor and to a variable impedance circuit in parallel with the signature resistor to produce a device signature that is substantially constant over a power range associated with the device detection input.

In another particular embodiment, a powered device includes an input, a signature resistor coupled to the input, and a variable impedance circuit. The input may be responsive to a powered network to receive a device detection input. The variable impedance circuit may be coupled to the input in parallel with the signature resistor. The variable impedance circuit includes an impedance that increases as a current associated with the device detection input increases to present an effective impedance to the powered network.

In another particular embodiment, a method of generating a device detection signature for a Power over Ethernet (PoE) powered device is disclosed. The method includes receiving a device detection input at a powered device from a powered network and applying the device detection input to a signature resistor and to a variable impedance circuit in parallel with the signature resistor to produce an effective impedance. The method further includes providing a device signature to the powered network based on the effective impedance.

DETAILED DESCRIPTION OF THE DRAWINGS

In a particular embodiment, a powered device is disclosed that includes an impedance circuit having a signature resistor and a variable impedance circuit in parallel to the signature resistor. The signature resistor and the variable impedance circuit cooperate to provide an effective resistance that is substantially constant over a range of input voltages and over a range of temperatures. The impedance circuit may be utilized to provide a device signature for a Power over Ethernet (PoE) powered device in response to a device detection input received from power sourcing equipment (PSE) via a powered network.

Figure 1:
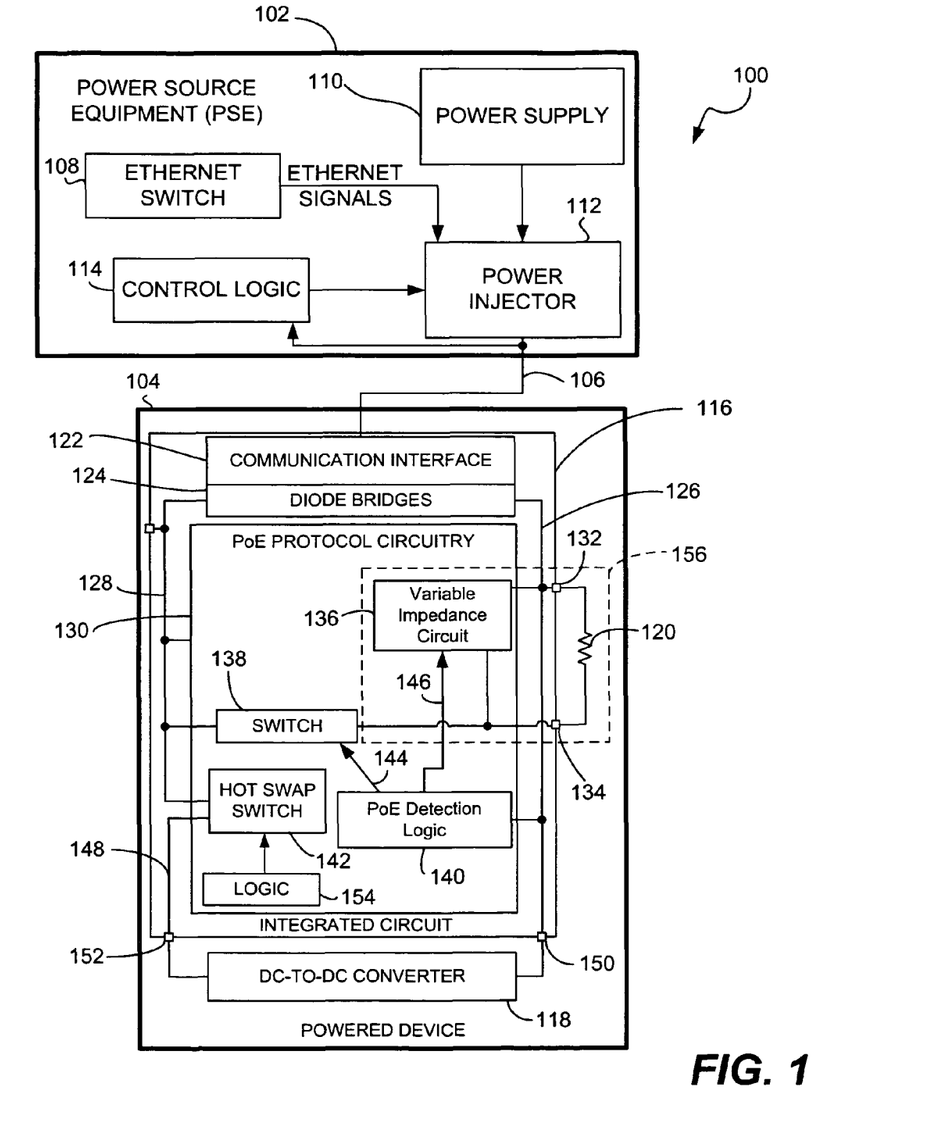
FIG. 1 is a block diagram of a particular illustrative embodiment of a power over Ethernet (PoE) system.

FIG. 1 is a block diagram of a particular illustrative embodiment of a power over Ethernet (PoE) system 100. The system 100 includes power sourcing equipment (PSE) 102 and a powered device 104 coupled by a network cable 106. The network cable 106 may be a twisted pair Ethernet cable, such as a category 5 (CAT5) Ethernet cable or another type of cable adapted to carry power and data. In general, the PSE 102 may be coupled to multiple powered devices (such as the powered device 104) via multiple network cables, where each network cable is associated with a particular powered device.

The PSE 102 may include an Ethernet switch 108, a power supply 110, a power injector 112, and control logic 114. In general, the power injector 112 is coupled to the Ethernet switch 108, the power supply 110, and the control logic 114. The powered device 104 may include an integrated circuit 116, a direct current-to-direct current (DC-to-DC) converter 118, and a signature resistor 120. In general, the signature resistor 120 may be a resistor having a fixed resistance value (such as the 25 k-ohm precision resistance specified in the PoE standard). In a particular illustrative embodiment, the signature resistor 120 may be a precision external resistor having an error tolerance value that is less than approximately 1%.

The integrated circuit 116 may include a communications interface 122, one or more diode bridges 124, a first power supply terminal 126, a second power supply terminal 128, PoE protocol circuitry 130, a third power supply terminal 148, and pins 132, 134, 150 and 152. The PoE protocol circuitry 130 may include a variable impedance circuit 136, a switch 138, PoE detection logic 140, a hot swap switch 142, and logic 154. The signature resistor 120 may be coupled to the first power supply terminal 126 via the pin 132 and to the switch 138 via the pin 134. The DC-to-DC converter 118 may be coupled to the first power supply terminal 126 via the pin 150 and to the third power supply terminal 148 via the pin 152. The hot swap switch 142 may be controlled by the logic 154 to selectively couple the second power supply terminal 128 to the third power supply terminal 148 to supply power to the DC-to-DC converter 118 to a voltage return path provided by the second power supply terminal 128 during normal operation. Generally, during a powered device detection process, the hot swap switch 142 is deactivated to isolate the DC-to-DC converter 118 from the return voltage path.

From the perspective of the PSE 102, during the powered device detection process, the control logic 114 may control the power injector 112 to apply a detection input, such as a voltage or a current, to a particular network cable, such as the network cable 106. In a particular illustrative embodiment, the detection input may be a voltage in a range of 2 volts to 10 volts. The control logic 114 may monitor a return current or voltage to detect the presence of a powered device, such as the powered device 104. If the control logic 114 detects a signature (i.e. a valid resistance that is approximately 25 k-ohms) associated with the powered device 104, the control logic 114 may control the power injector 112 to apply power and data to the network cable 106. Alternatively, if the control logic 114 does not detect a powered device signature, the control logic 114 may control the power injector 112 to apply only data to the network cable 106.

From the perspective of the powered device 104, during the device detection process, a detection input (such as a voltage within a range of 2 volts to 10 volts) is received by communication interface 122 from the network cable 106. The communication interface 122 may be a connection interface, such as an RJ-45 Ethernet connector, an electrical distribution block, or other connection interface to receive power and data from the network cable 106. The detection input may be rectified by the one or more diode bridges 124, and the rectified detection input may be applied to the first and second voltage supply terminals 126 and 128. In response to the detection input, the PoE detection logic 140 may selectively activate the switch 138 via a control signal 144 to couple the pin 134 to the second power supply terminal 128, applying the rectified detection input to the signature resistor 126 and to the variable impedance circuit 136 in parallel. In a particular embodiment, the variable impedance circuit 136 has an impedance value that increases as a current level, a voltage level, or a power level of the detection input increases.

In general, the one or more diode bridges 124 include multiple diodes. The impedance of a particular diode is related to the current, such that the diode impedance decreases as the current level increases. The increasing impedance of the variable impedance circuit 136 may compensate for the decrease in the diode impedance, as a current level of the detection input increases. In a particular illustrative embodiment, the variable impedance circuit 136 tracks the current across the signature resistor 120 and adjusts automatically to compensate for increased current flow. In a particular alternative, non-limiting embodiment, the PoE detection logic 140 may control an impedance level of the variable impedance circuit 136 via a control signal, such as the control signal 146.

In another particular illustrative embodiment, an impedance circuit 156 includes the variable impedance circuit 136 in parallel with the signature resistor 120 to provide an effective impedance that remains substantially constant over a range of detection input values, such as from a detection input that ranges from 2 volts to 10 volts. In general, the impedance of the variable impedance circuit 136 may be adjusted to maintain a substantially constant effective impedance even when the diode impedance changes. The current path of the one or more diode bridges 124, the signature resistor 120 and the variable impedance circuit 136 present an effective input impedance ($Z_{in}$eff) based on the impedance of the diodes ($Z_{diodes}$) and the resistances of the resistor 120 ($R_{120}$) and the variable impedance circuit 136 ($Z_{136}$ measured as a resistance) according to the following equation:

$$Z_{in}\text{eff} = Z_{diodes} + \frac{R_{120} \times Z_{136}}{R_{120} + Z_{136}} \qquad \text{(Equation 1)}$$

Though the signature resistor 120 is external to the integrated circuit 116, in a particular illustrative embodiment, the signature resistor 120 may instead be integrated with integrated circuit 116. In another particular illustrative embodiment, the variable impedance circuit 136 may be external to the integrated circuit 116.

Figure 2:
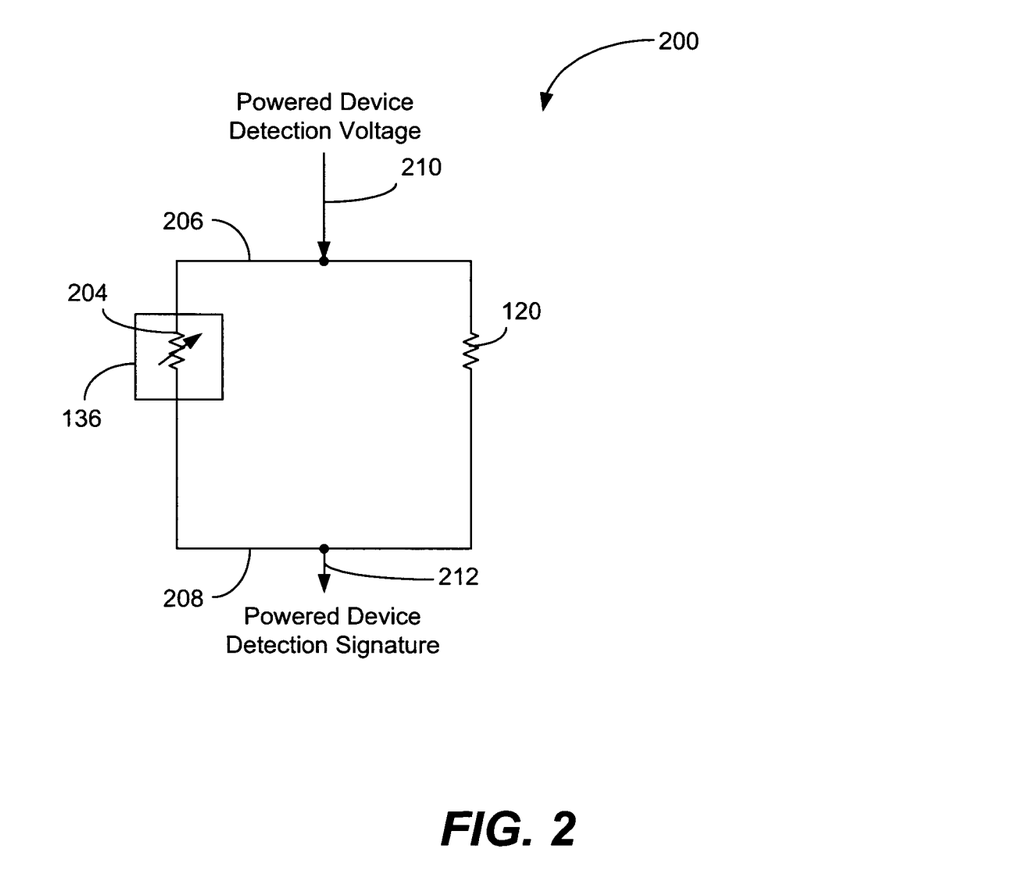
FIG. 2 is a circuit diagram of a particular illustrative embodiment of an impedance circuit to provide a powered device detection signature.

FIG. 2 is a circuit diagram of a particular illustrative embodiment of an impedance circuit 200 including the signature resistor 120 and a particular illustrative embodiment of the variable impedance circuit 136, shown in FIG. 1, to provide a powered device detection signature. The variable impedance circuit 136 includes a variable resistor 204. The signature resistor 120 is coupled to a first power supply terminal 206 and to a second power supply terminal 208. The variable resistor 204 is coupled to the first and second power supply terminals 206 and 208 in parallel with the signature resistor 120.

In a particular illustrative embodiment, a powered device detection input is applied to the first power supply terminal 206 via a line 210. The powered device detection input may be a detection voltage or a detection current that is received from a powered network. The signature resistor 120 and the variable resistor 204 provide an effective resistance, which relates to a device signature of the powered device. The device signature may be provided to a network cable via a line 212. In a particular embodiment, logic, such as the PoE detection logic 140 in FIG. 1 may adjust the variable resistor 204 to alter the effective resistance of the impedance circuit 200, providing a powered device signature to the network cable. In another particular embodiment, a thermister, a sense resistor, or any combination thereof (not shown) may be used to monitor a parameter of the impedance circuit 200 (such as temperature, current, voltage, or any combination thereof) and adjust the variable resistor 204 to control the effective impedance.

Figure 3:
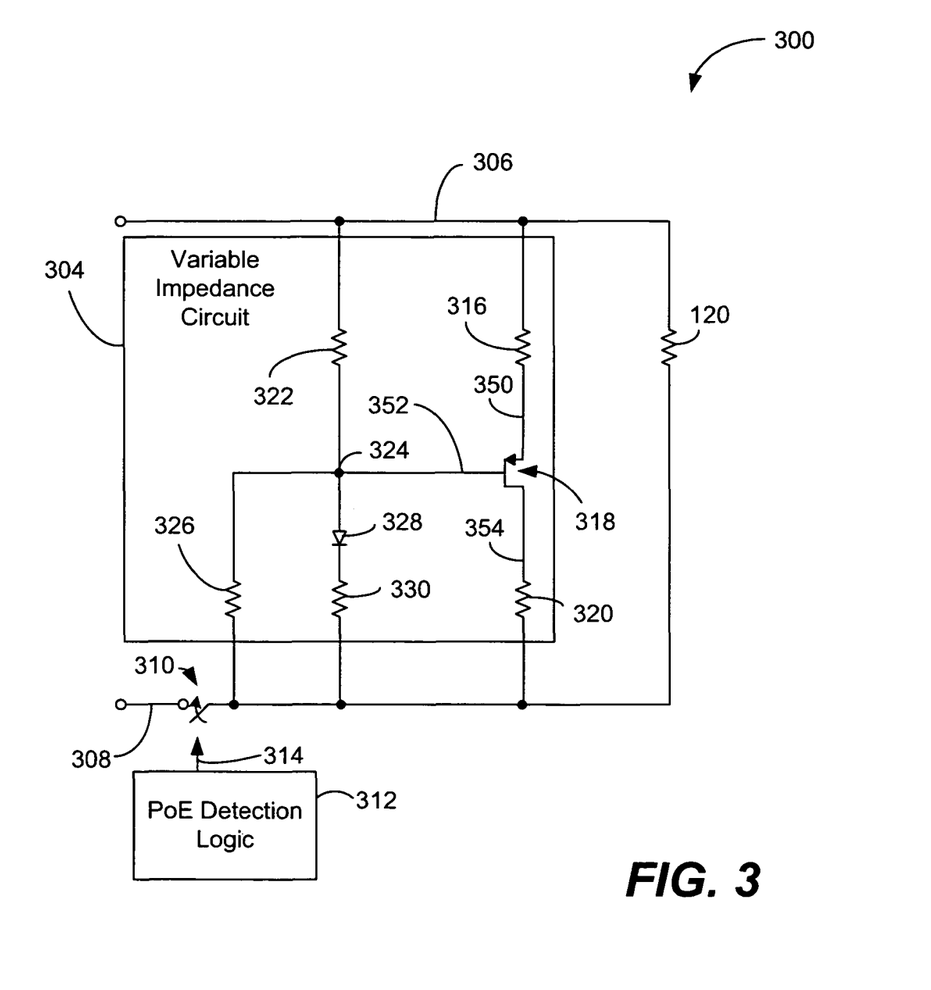
FIG. 3 is a general diagram of a second particular illustrative embodiment of an impedance circuit.

FIG. 3 is a general diagram of a second particular illustrative embodiment of an impedance circuit 300 including the signature resistor 120 and another particular illustrative embodiment of a variable impedance circuit 304, such as the variable impedance circuit 136 illustrated in FIG. 1. The impedance circuit 300 also includes a first power supply terminal 306, a second power supply terminal 308, and a switch 310. The impedance circuit 300 may also include logic 312. The impedance circuit 304 may include resistors 316, 320, 322, 326, and 330, a diode 328, and a transistor 318. In general, the resistor 120 is coupled to the first power supply terminal 306 and to the switch 310, which is coupled to the second power supply terminal 308. The resistor 316 is coupled to the first power supply terminal 306 and to a first terminal 350 of the transistor 318, which includes a control terminal 352 and a second terminal 354. The second terminal 354 is coupled to the resistor 320, which is coupled to the second power supply terminal 308. The control terminal 352 is coupled to a node 324. The resistor 322 is coupled to the first power supply terminal 306 and to the node 324. The resistor 326 is coupled to the node 324 and to the second power supply terminal 308. The diode 328 includes an anode terminal that is coupled to the node 324 and includes a cathode terminal that is coupled to the resistor 330, which is also coupled to the second power supply terminal 308 via the switch 310.

In a particular embodiment, the logic 312 may activate the switch 310 via a control line 314 to selectively couple the signature resistor 120 and the variable impedance circuit 304 to the second power supply terminal 308. In a particular illustrative embodiment, the resistor 322 may have a resistance of approximately 2 M-ohms and the resistor 120 may have a resistance of approximately 25 k-ohms. In a particular embodiment, the transistor 318 may be a p-channel transistor.

In a particular illustrative embodiment, when the voltage differential between the first and second power supply terminals 306 and 308 is low (such as 2 volts), a voltage level at the node 324 is at a voltage level that is less than approximately 1 volt, and the transistor 318 is active to present a relatively low impedance to current flow between the first and second power supply terminals 306 and 308, establishing an effective impedance that is less than the impedance value of the resistor 120. As the voltage differential increases, a voltage level at the node 324 increases and current flow via the transistor 318 is decreased. Thus, the impedance of the variable impedance circuit 304 varies with the current flow as the differential voltage applied to the first and second power supply terminals 306 and 308 varies.

As the voltage differential increases between the first and second power supply terminals 306 and 308, current flow across the resistor 322 may cause the voltage level at the node 324 to rise to a level that is sufficient to shut off the transistor 318, thereby clamping the variable impedance circuit at a particular impedance value. In a particular embodiment, the effective impedance value ($Z_{impedance}$) may be determined according to the following equation:

$$Z_{impedance} = (R_{322} + (Z_{diode} + R_{330})//R_{326})/(R_{316} + R_{320}). \quad \text{(Equation 2)}$$

In a particular illustrative embodiment, temperature effects and impedance variations in the diodes of a diode bridge, such as the one or more diode bridges 124 in FIG. 1 may be compensated by the variable impedance circuit 304, so that the impedance circuit 300 provides a substantially constant device signature (e.g., effective impedance), which may be detected by power sourcing equipment (such as PSE 102 in FIG. 1) to determine the presence of a Power over Ethernet (PoE) compliant device.

Figure 4:
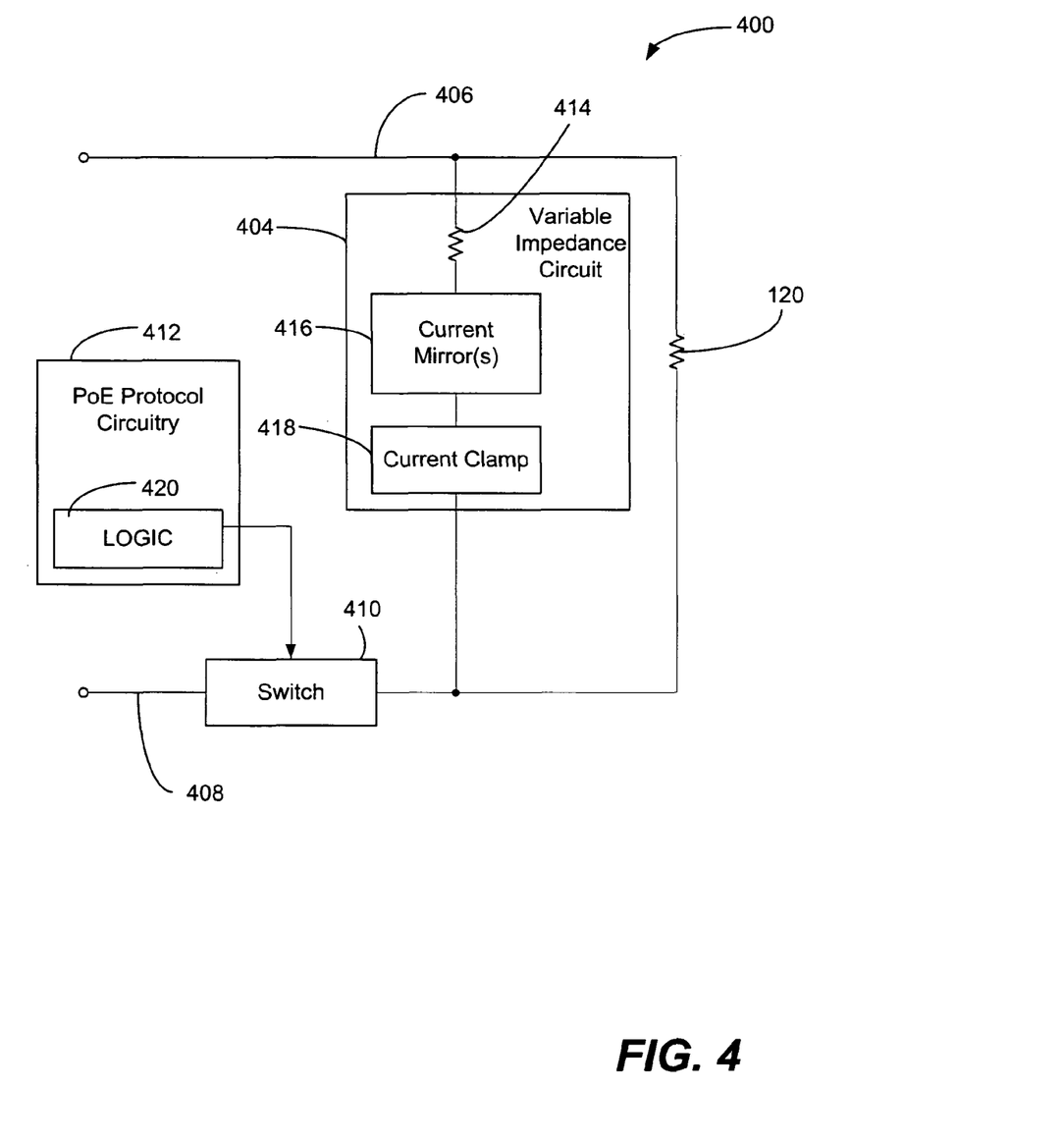
FIG. 4 is a general diagram of a third particular illustrative embodiment of an impedance circuit.

FIG. 4 is a general diagram of a third particular illustrative embodiment of an impedance circuit 400 including the signature resistor 120 and a particular illustrative embodiment of a variable impedance circuit 404, such as the variable impedance circuit 136 in FIG. 1. The impedance circuit 400 also includes a first power supply terminal 406, a second power supply terminal 408, and a switch 410. The impedance circuit 400 may be responsive to a Power over Ethernet (PoE) protocol circuit 412 to selectively activate the switch 410. The variable impedance circuit 404 includes a resistor 414, one or more current mirrors 416, and a current clamp 418. The PoE protocol circuitry 412 includes logic 420. The signature resistor 120 is coupled to the first power supply terminal 406 and to the switch 410. The variable impedance circuit 404 is coupled to the first power supply terminal 406 and to the switch 410 in parallel with the signature resistor 120. The PoE protocol circuitry 412 may utilize logic 420 to control the switch to selectively couple the signature resistor 120 and the variable impedance circuit 404 to the second power supply terminal 408.

In a particular illustrative embodiment, the variable impedance circuit 404 is in parallel with the signature resistor 120 to present an effective impedance. As the voltage level and/or current level across the signature resistor 120 increases, the impedance of the variable impedance circuit 404 is increased, altering the effective impedance of the impedance circuit 400. In a particular embodiment, the impedance of the variable impedance circuit is determined by the resistor 414, which feeds current to the current mirrors 416. The currents of the current mirrors 416 track the current in the resistor 414, until the current levels exceed a threshold. The current clamp 418 is activated to clamp the current at a particular level when the current level exceeds the threshold, so that any additional current is forced through the signature resistor 120. The variable impedance circuit 404 increases its impedance as the detection input increases, compensating for changes in diode impedance of the diode bridge, such as the one or more diode bridges 124 in FIG. 1. Moreover, each of the current mirrors 416 may include a temperature coefficient that compensates for temperature effects created by diodes of the diode bridge. Thus, temperature effects of the diodes within the diode bridge may also be compensated for.

In a particular illustrative embodiment, the impedance circuit 400 may produce an effective impedance that is substantially constant over a range of input voltages related to the detection input and over a range of temperatures. For example, in a particular illustrative, non-limiting embodiment, the effective impedance may remain constant within approximately plus or minus one percent over a range of input voltages from 2 volts to 10 volts and over a range of temperatures from −40 C to 85 C.

Figure 5:
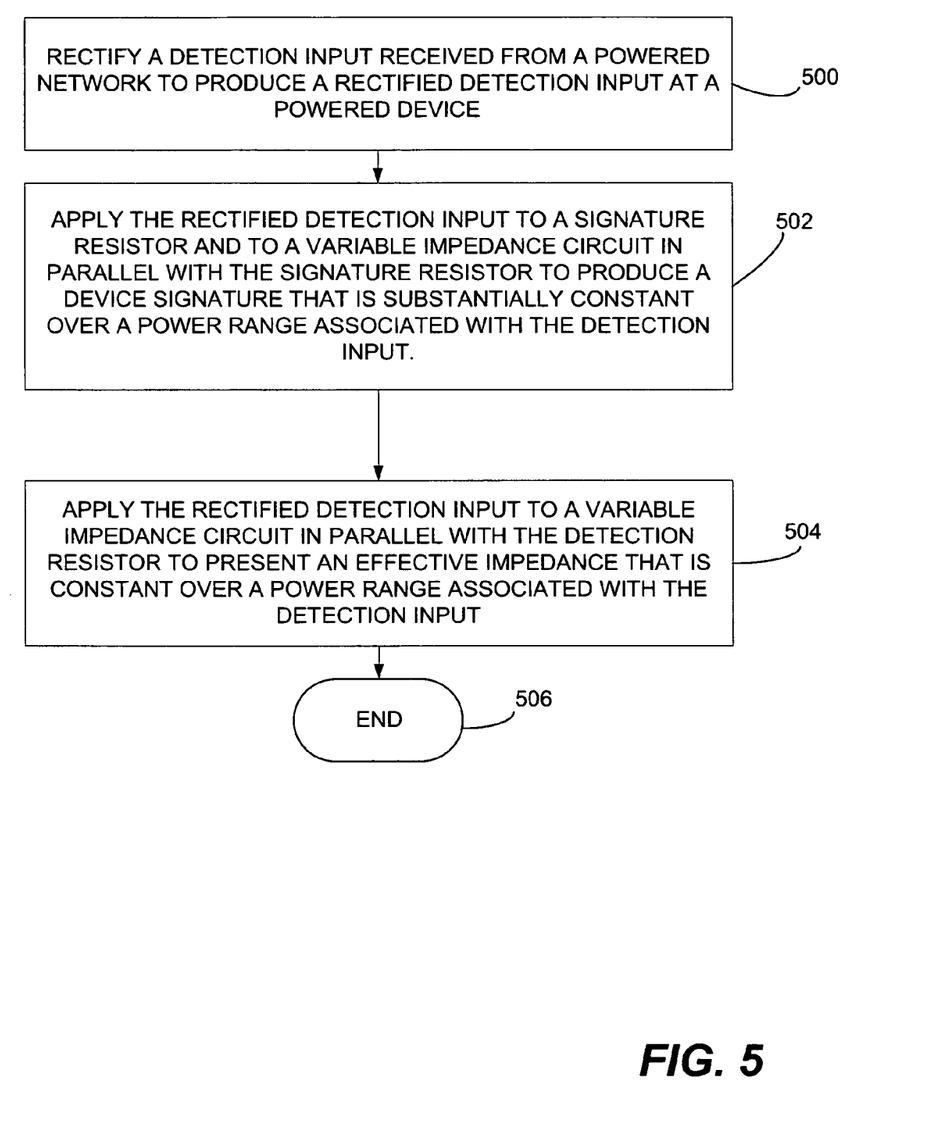
FIG. 5 is a flow diagram of a first particular embodiment of a method of producing a powered device detection signature.

FIG. 5 is a flow diagram of a first particular embodiment of a method of producing a powered device detection signature. During a powered device detection process, a device detection input received from a powered network is rectified to produce a rectified detection input at a powered device, at 500. The rectified detection input is applied to a signature resistor and to a variable impedance circuit in parallel with the signature resistor to produce a device signature that is substantially constant over a power range associated with the detection input, at 502. The method terminates, at 504.

In a particular embodiment, a switch may be activated to selectively apply the device detection input to at least one of the signature resistor and the variable impedance circuit. In a particular illustrative embodiment, the switch may selectively couple the variable impedance circuit in parallel with the signature resistor, so that the variable impedance circuit may be activated only during device detection, allowing the signature resistor to be utilized for other purposes. For example, the signature resistor could be used to provide a reference current by applying a fixed voltage to the signature resistor during another mode of operation. In this instance, the variable impedance circuit may be disconnected to conserve power consumption.

In a particular embodiment, a device signature is provided to the powered network based on the effective impedance. In a particular illustrative embodiment, the detection input may be a current or a voltage received from a powered network, such as a Power over Ethernet (PoE) network. In a particular illustrative embodiment, the rectified detection input is applied to the signature resistor and to the variable impedance circuit by activating a switch to selectively couple the resistor and the variable impedance circuit to a second power supply terminal to complete a circuit.

In general, a resistance of the variable impedance circuit may be increased as a power level of the rectified detection input increases. In a particular illustrative embodiment, the impedance of the variable impedance circuit may be increased to compensate for reductions in impedance associated with a diode bridge. In another particular embodiment, a current that is based on the detection input may be provided to a resistor that is coupled to a set of current mirrors (such as the current mirrors 416 in FIG. 4). The mirror currents may be clamped at a fixed level when the mirror currents exceed a threshold.

Figure 6:
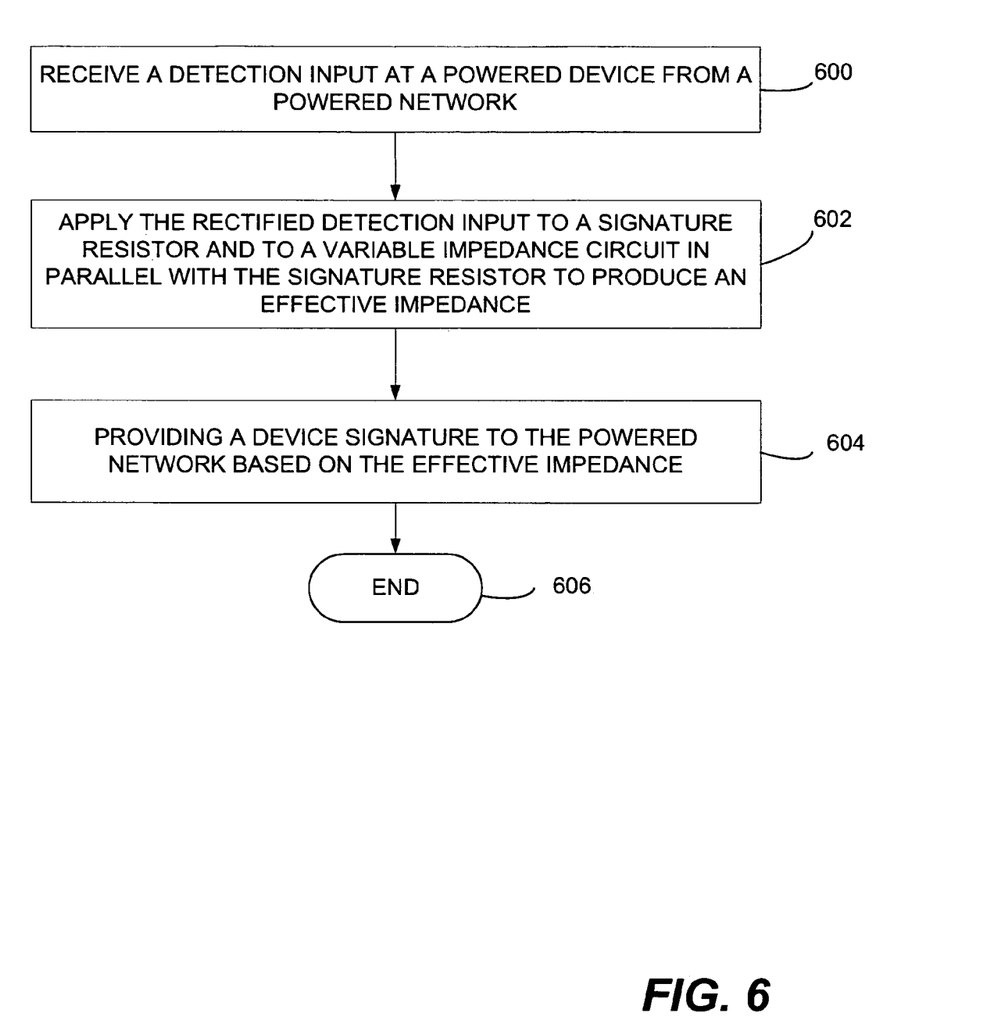
FIG. 6 is a flow diagram of a second particular embodiment of a method of producing a powered device detection signature.

FIG. 6 is a flow diagram of a second particular embodiment of a method of producing a powered device detection signature during a device detection process. A detection input is received from a powered network at a powered device, at 600. The detection input is applied to a signature resistor and to a variable impedance circuit in parallel with the signature resistor to produce an effective impedance during the device detection process, at 602. A detection signature is provided to the powered network based on the effective impedance, at 604. The method terminates, at 606.

In a particular embodiment, the signature resistor may be used only during the device detection process, and the signature resistor and the variable impedance circuit may be applied to the detection input during the device detection process to present an effective impedance that represents the device signature. In another embodiment, the signature resistor may be a precision resistor that serves a dual purpose, such as both device detection and reference current generation. For example, the signature resistor may always be connected. During the device detection process, the signature resistor may provide a precision resistance. After the device detection process is completed, a reference voltage may be applied to the signature resistor to produce a reference current for use by the device. In this instance, the variable impedance circuit may be switched in parallel with the signature resistor during the device detection process and may be disconnected when the device detection process is completed to reduce power consumption.

In a particular embodiment, an impedance of the variable impedance circuit is increased to alter the effective impedance when the magnitude of the detection input is increased. In a particular embodiment, the detection signature remains substantially constant as the detection input is increased. In another particular embodiment, the method may include rectifying the detection input via a diode bridge circuit and adjusting an impedance of the variable impedance circuit to compensate for diode impedance changes in a current path of the diode bridge circuit. In a particular illustrative embodiment, the method may include clamping a current level of the variable impedance circuit at a fixed level when the current level exceeds a threshold.

In another particular illustrative embodiment, the method may include rectifying the detection input via a diode bridge circuit including a plurality of diodes and adjusting an impedance of the variable impedance circuit to compensate for temperature effects created by the plurality of diodes.

Although the present specification describes components and functions that may be implemented in particular embodiments with reference to particular standards and protocols, use of specific embodiments is not limited to such standards and protocols. For example, the standard for Power over Ethernet (i.e. IEEE Std 802.3™-2005 clause 33) represents an example of the state of the art. Such standards are periodically superseded by faster or more efficient equivalents having essentially the same functions. Accordingly, replacement standards and protocols having the same or similar functions as those disclosed herein are considered equivalents thereof. Additionally, Power over Ethernet represents a particular implementation where power and data are transmitted via the same cable. Other types of powered networks are also contemplated. For example, the disclosed embodiments of the impedance circuit may be utilized to present a substantially constant impedance in response to a voltage supply received from electrical power lines that also carry data transmissions.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A powered device comprising:
    an input configured to couple to a Power over Ethernet network to receive a device detection signal from a power sourcing equipment device;
    a signature resistor coupled to the input; and
    a variable impedance circuit coupled to the input in parallel with the signature resistor, the variable impedance circuit having an impedance that increases as a current associated with the device detection signal increases, the signature resistor and the variable impedance circuit cooperate to present an impedance to the power sourcing equipment device, the variable impedance circuit compensates for variations in diode impedance of a diode bridge coupled to the input.

2. The powered device of claim 1, further comprising a switch to selectively couple the signature resistor and the variable impedance circuit to a power supply terminal during a device detection process.

3. The powered device of claim 2, further comprising logic to selectively activate the switch.

4. The powered device of claim 1, wherein the variable impedance circuit comprises:
a power supply terminal;
a first resistor coupled to an input and to a node;
a second resistor coupled to the input;
a third resistor coupled to the power supply terminal;
a transistor including a first terminal coupled to the second resistor, a control terminal coupled to the node, and a third terminal coupled to the third resistor; and
a fourth resistor coupled to the power supply terminal and to the node;
wherein the first resistor and the fourth resistor divide the device detection signal to bias the control terminal of the transistor to adjust current flow through the variable impedance circuit.

5. The powered device of claim 1, wherein the variable impedance circuit comprises a variable resistor.

6. The powered device of claim 4, wherein the variable impedance circuit comprises:
a resistor coupled to a first power supply terminal and to a node; and
a set of current mirrors coupled to the node to track a current across the resistor to alter the impedance.

7. The powered device of claim 6, wherein each current mirror of the set of current mirrors has a mirror current, and wherein the mirror current is clamped at a fixed level when the mirror current exceeds a threshold.

8. The powered device of claim 6, wherein each current mirror has a temperature coefficient that compensates for temperature effects created by diodes of the diode bridge.

9. The powered device of claim 1, wherein the impedance is substantially constant across a range of device detection input values.

10. The powered device of claim 1, wherein, in response to the device detection signal, the impedance produces a current that represents a device signature.

11. A powered device comprising:
a diode bridge circuit including an input configured to couple to a Power over Ethernet network and to receive a device detection input signal from a power sourcing equipment device, and including an output terminal for carrying a rectified version of the device detection input signal; and
an impedance circuit coupled to the output terminal, the impedance circuit including a signature resistor configured to be selectively coupled to the output terminal and including a variable impedance circuit in parallel with the signature resistor, the variable impedance circuit having a variable impedance that increases as a current associated with the device detection input signal increases, the impedance circuit configured to cooperate with the signature resistor to present an impedance to the power sourcing equipment device to compensate for variations in diode impedance of the diode bridge during a device detection process.

12. The powered device of claim 11, wherein the impedance circuit produces a device signature that is substantially constant over a power range associated with the device detection input.

13. The powered device of claim 11, wherein the variable impedance circuit comprises:
a resistor coupled to a first power supply terminal and to a node; and
a set of current mirrors coupled to the node to track a current through the resistor; and
a current clamp coupled to the set of current mirrors and configured to clamp the current through the variable impedance circuit to a pre-determined current level when the current through the resistor exceeds a threshold.

14. The powered device of claim 11, further comprising:
a first pin coupled to the output terminal and coupled to a first terminal of the signature resistor and to a first terminal of the variable impedance circuit;
a second pin coupled a second terminal of the signature resistor and to a second terminal of the variable impedance circuit; and
a switch including a first current electrode coupled to the second pin and a second current electrode coupled to a power supply terminal, the switch responsive to a control signal to selectively couple the second pin to the power supply terminal.

15. The powered device of claim 14, further comprising a control circuit coupled to the switch and configured to selectively activate the switch to couple the second pin to the power supply terminal.

16. A powered device comprising:
a connector configured to couple to a Power over Ethernet network and to receive a device detection signal from a power sourcing equipment device;
a diode bridge including at least one input terminal coupled to the connector to receive the device detection signal and including a first output terminal and a second output terminal for carrying a rectified version of the device detection signal;
an impedance circuit including a first terminal coupled to the first output terminal and a second terminal, the impedance circuit including a signature resistor and a variable impedance circuit coupled in parallel between the first terminal and the second terminal; and
a switch including a first current electrode coupled to the second output terminal and a second current electrode coupled to the second terminal of the impedance circuit, the switch configured to selectively couple the second terminal to the second output terminal during a device detection process to apply an impedance between the first and second output terminals.

17. The powered device of claim 16, further comprising a control circuit configured to selectively activate the switch to couple the impedance circuit to the second output terminal to provide a device signature based on the impedance.

18. The powered device of claim 17, wherein the device signature remains substantially constant as the device detection signal increases.

19. The powered device of claim 16, wherein an impedance of the variable impedance circuit increases when the device detection signal increases.

20. The powered device of claim 16, wherein an impedance of the variable impedance circuit compensates for diode impedance changes of the diode bridge.

21. The powered device of claim 16, wherein the impedance of the variable impedance circuit compensates for temperature effects created by diodes of the diode bridge.

\* \* \* \* \*